United States Patent
Das et al.

(10) Patent No.: US 11,928,438 B1
(45) Date of Patent: Mar. 12, 2024

(54) COMPUTING TECHNOLOGIES FOR LARGE LANGUAGE MODELS

(71) Applicant: Northern Trust Corporation, Chicago, IL (US)

(72) Inventors: Arijit Das, Naperville, IL (US); Justin Chapman, London (GB)

(73) Assignee: Northern Trust Corporation, Chicago, IL (US)

( * ) Notice: Subject to any disclaimer, the term of this patent is extended or adjusted under 35 U.S.C. 154(b) by 0 days.

(21) Appl. No.: 18/219,383

(22) Filed: Jul. 7, 2023

(51) Int. Cl.
| | |
|---|---|
| *G06F 40/40* | (2020.01) |
| *G06F 9/455* | (2018.01) |
| *G06F 21/64* | (2013.01) |
| *G06Q 50/18* | (2012.01) |
| *H04L 9/00* | (2022.01) |

(52) U.S. Cl.
CPC .............. *G06F 40/40* (2020.01); *G06F 9/455* (2013.01); *G06F 21/64* (2013.01); *G06Q 50/18* (2013.01); *H04L 9/50* (2022.05); *G06Q 2220/00* (2013.01)

(58) Field of Classification Search
USPC .......................................................... 705/79
See application file for complete search history.

(56) References Cited

U.S. PATENT DOCUMENTS

| | | | |
|---|---|---|---|
| 11,086,847 B2 * | 8/2021 | Sun | |
| 11,544,044 B2 * | 1/2023 | Liu | |
| 2006/0260441 A1 | 11/2006 | Hu | |
| 2007/0039422 A1 | 2/2007 | Rogers | |
| 2008/0083304 A1 | 4/2008 | Finn | |
| 2019/0176310 A1 | 6/2019 | McKenzie | |
| 2020/0097961 A1 | 3/2020 | Luo | |
| 2020/0184584 A1 | 6/2020 | Farivar | |
| 2021/0326864 A1 * | 10/2021 | Wei et al. | |
| 2022/0277140 A1 | 9/2022 | Rhim | |
| 2022/0292268 A1 | 9/2022 | Shillingford | |
| 2023/0252462 A1 * | 8/2023 | Mo | |

FOREIGN PATENT DOCUMENTS

| | | |
|---|---|---|
| CN | 110175454 B | 3/2021 |
| CN | 112632989 A | 4/2021 |
| CN | 113312035 A | 8/2021 |
| CN | 114548072 A | 5/2022 |
| CN | 115525757 A | 12/2022 |
| CN | 115809653 A | 3/2023 |
| WO | WO2020212967 A1 | 10/2020 |

(Continued)

OTHER PUBLICATIONS https://dfi.wa.gov/financial-education/information/debit-cards-frequently-asked-questions (Year: 2006).*

(Continued)

*Primary Examiner* — James D Nigh
*Assistant Examiner* — Yin Y Choi
(74) *Attorney, Agent, or Firm* — Dentons US LLP

(57) ABSTRACT

This disclosure enables various computing technologies for smart contracts to be audited in ways that improve on conventional auditing approaches mentioned above. These technologies improve functioning of computers by enabling large language models to review bytecodes executable on distributed ledgers to determine whether those bytecodes enable smart contracts on those distributed ledgers and then acting accordingly.

30 Claims, 2 Drawing Sheets

(56) References Cited

FOREIGN PATENT DOCUMENTS

| WO | WO2021040124 A1 | 3/2021 |
| WO | WO2022165562 A1 | 8/2022 |

OTHER PUBLICATIONS

Sirisha, Top 10 Ways ChatGPT can Assist Blockchain developers, Feb. 2023, https://www.analyticsinsight.net/top-10-ways-chatgpt-can-assist-blockchain-developers/ (13 pages).

Li, Intelligent Contracts—the AI Solution for the Issue of Security and Smart Contracts, Matrix AI Network, May 2018, https://matrixainetwork.medium.com/intelligent-contracts-the-ai-solution-for-the-issue-of-security-and-smart-contracts-a992d1368fd1 (25 pages).

* cited by examiner

COMPUTING TECHNOLOGIES FOR LARGE LANGUAGE MODELS

TECHNICAL FIELD

This disclosure relates to large language models.

BACKGROUND

A digital asset (e.g., a digital token) may be deployed on a distributed ledger (e.g., a blockchain) and be managed by a smart contract deployed on the distributed ledger. The smart contract may need to be audited. Conventionally, the smart contract is audited by a "black box" testing method and a code review method.

The "black box" testing method involves an auditor providing a set of test inputs to the smart contract, receiving a set of corresponding outputs from the smart contract, and verifying the set of corresponding outputs against a set of expected outputs. This method is technologically deficient, because this approach may miss an edge case or have an input that is not easy to anticipate.

The code review method involves a software engineer reviewing a bytecode for the smart contract. This method is not fool proof and often relies on expertise of the software engineer to determine what the smart contract represents. Since the smart contract may be difficult to reason about directly, such review of the bytecode may be time-consuming and laborious.

Regardless of what method is employed to audit the smart contract, this technological problem is compounded by an uncertainty in a legal implication of the smart contract itself. Since the auditor or the software engineer are typically not legally trained, there may be a legal nuance that may not appreciated (e.g., missed) by the auditor or the software engineer, especially if the legal nuance impacts the smart contract from an enforceability perspective.

SUMMARY

This disclosure enables various computing technologies for smart contracts to be audited in ways that improve on conventional auditing approaches mentioned above. These technologies improve functioning of computers by enabling large language models to review bytecodes executable on distributed ledgers to determine whether those bytecodes enable smart contracts on those distributed ledgers and then acting accordingly.

A system may comprise: a computing instance programmed to: host a large language model (LLM) trained to (i) read a bytecode capable of being executed on a distributed ledger, (ii) determine whether the bytecode enables a smart contract on the distributed ledger, and (iii) take a first action based on the bytecode being determined to enable the smart contract and a second action based on the bytecode being determined to not enable the smart contract, wherein the bytecode enables the smart contract by expressing (1) an offeror identifier associated with an offeror network address on the distributed ledger, (2) an offeree identifier associated with an offeree network address on the distributed ledger, (3) an offer expression associated with the offeror identifier, (4) an acceptance expression associated with the offeree identifier, and (5) a consideration expression associated with the offeror identifier and the offeree identifier, wherein the first action includes (a) identifying the offer expression, the acceptance expression, and the consideration expression, (b) generating a human-readable content describing the offer expression, the acceptance expression, and the consideration expression, and (c) outputting the human-readable content for consumption on a computing terminal, wherein the second action includes outputting a notice for consumption on the computing terminal, wherein the notice indicates the bytecode being determined to not enable the smart contract; and host a logic programmed to (i) receive the offeror network address from the computing terminal and the offeree network address from the computing terminal, (ii) locate the bytecode on the distributed ledger based on the offeror network address and the offeree network address, (iii) form a copy of the bytecode, and (iv) prompt the LLM with the copy such that the LLM (a) determines whether the copy enables the smart contract and (b) takes the first action based on the copy being determined to enable the smart contract and the second action based on the copy being determined to not enable the smart contract.

A method may comprise: hosting, by a computing instance, a large language model (LLM) trained to (i) read a bytecode capable of being executed on a distributed ledger, (ii) determine whether the bytecode enables a smart contract on the distributed ledger, and (iii) take a first action based on the bytecode being determined to enable the smart contract and a second action based on the bytecode being determined to not enable the smart contract, wherein the bytecode enables the smart contract by expressing (1) an offeror identifier associated with an offeror network address on the distributed ledger, (2) an offeree identifier associated with an offeree network address on the distributed ledger, (3) an offer expression associated with the offeror identifier, (4) an acceptance expression associated with the offeree identifier, and (5) a consideration expression associated with the offeror identifier and the offeree identifier, wherein the first action includes (a) identifying the offer expression, the acceptance expression, and the consideration expression, (b) generating a human-readable content describing the offer expression, the acceptance expression, and the consideration expression, and (c) outputting the human-readable content for consumption on a computing terminal, wherein the second action includes outputting a notice for consumption on the computing terminal, wherein the notice indicates the bytecode being determined to not enable the smart contract; and hosting, by the computing instance, a logic programmed to (i) receive the offeror network address from the computing terminal and the offeree network address from the computing terminal, (ii) locate the bytecode on the distributed ledger based on the offeror network address and the offeree network address, (iii) form a copy of the bytecode, and (iv) prompt the LLM with the copy such that the LLM (a) determines whether the copy enables the smart contract and (b) takes the first action based on the copy being determined to enable the smart contract and the second action based on the copy being determined to not enable the smart contract.

DETAILED DESCRIPTION

Figure 1:
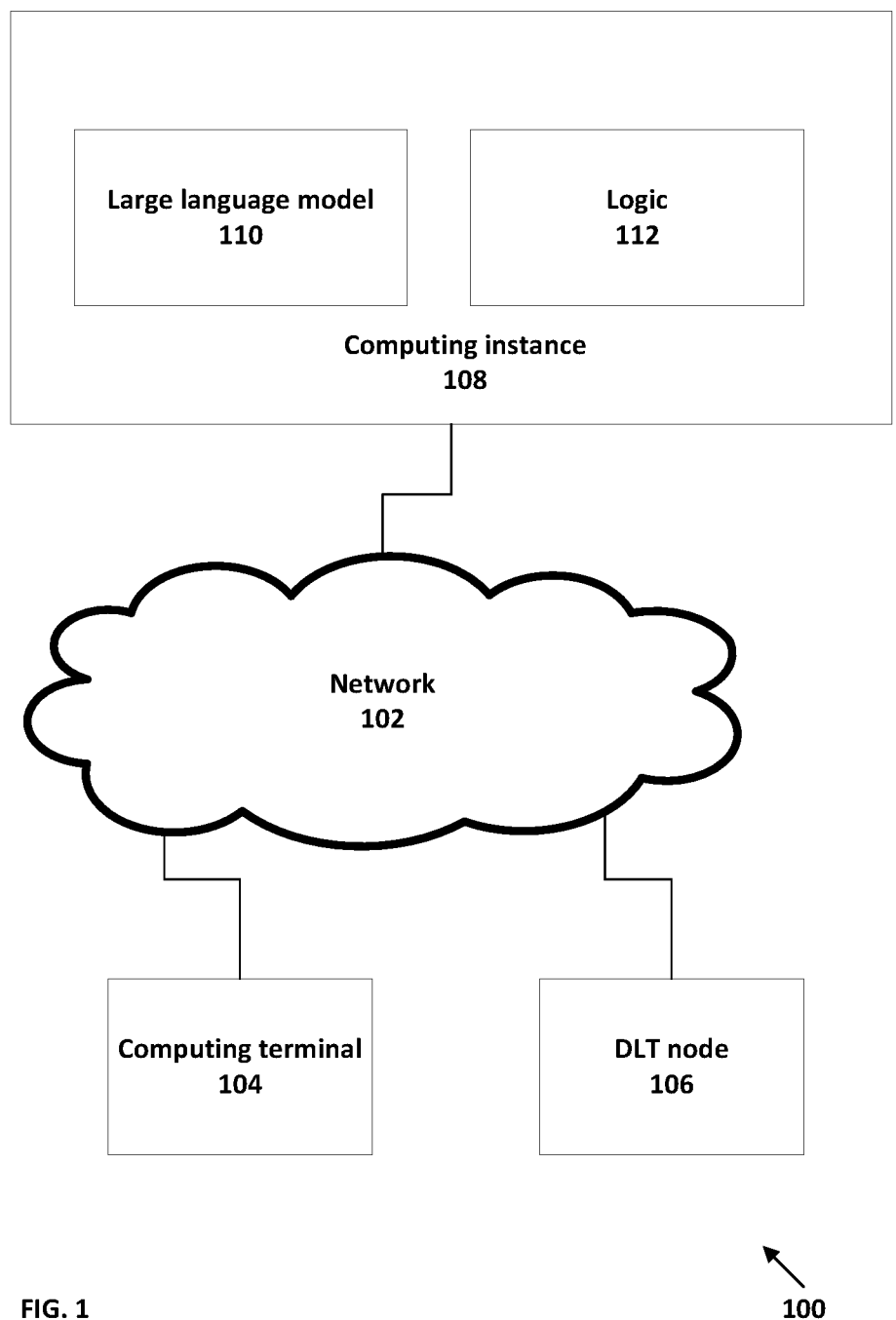
FIG. 1 shows a diagram of an embodiment of a computing architecture according to this disclosure.

As explained above, this disclosure enables various computing technologies for smart contracts to be audited in ways that improve on conventional auditing approaches mentioned above. These technologies improve functioning of computers by enabling large language models to review bytecodes executable on distributed ledgers to determine whether those bytecodes enable smart contracts on those distributed ledgers and then acting accordingly. This disclosure is now described more fully with reference to various figures that are referenced above, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms (e.g., two, three, four) as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, subsets, diagrams, or sections, these elements, components, regions, layers, subsets, diagrams, or sections should not necessarily be limited by such terms. Rather, these terms are used to distinguish one element, component, region, layer, subset, diagram, or section from another element, component, region, layer, subset, diagram, or section. As such, a first element, component, region, layer, subset, diagram, or section discussed below could be termed a second element, component, region, layer, subset, diagram, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

FIG. 1 shows a diagram of an embodiment of a computing architecture according to this disclosure. In particular, a computing architecture 100 includes a network 102, a computing terminal 104, a distributed ledger technology (DLT) node 106, and a computing instance 108. The computing instance 108 hosts a large language model (LLM) 110 and a logic 112.

The network 102, whether wired, waveguide, or wireless, may include a local area network (LAN), a wide area network (WAN), a satellite network, a cellular network, or any other suitable network. The network 102 may include Internet.

The computing terminal 104 (e.g., a desktop computer, a laptop computer, a smartphone, a tablet computer, a server, a client) may run an operating system (OS) and an application program (e.g., a web browser application program) on the OS. The application program may have a navigation section (e.g., a set of navigation buttons, an address bar, an options menu, a tab section, a bookmark bar) and a viewport operative based on the navigation section, where the viewport may be below or lateral to the navigation section when the computing terminal 104 is upright for use. The computing terminal 104 may be in communication (e.g., wired, wireless, waveguide) with the network 102.

The DLT node 106 (e.g., a desktop computer, a laptop computer, a smartphone, a tablet computer, a server, a client, a server farm, a cloud computing instance) may be a node of a peer-to-peer (P2P) computer network enabling a performance of a consensus algorithm (e.g., a proof-of-work algorithm, a proof-of-stake algorithm) such that a distributed ledger (e.g., a blockchain) is distributably replicated across the P2P computer network (e.g., servers, clients, server farms, cloud computing instances), including the DLT node 106, where each node of the P2P computer network, including the DLT node 106, copies and saves an identical copy of ledger data and updates itself independently of other respective nodes. The P2P computer network, including the DLT node 106, may be a public network or a private network. The P2P computer network, including the DLT node 106, may be an Ethereum network having an Ethereum virtual machine (VM) or another suitable P2P computer network with a suitable distributed VM on which a smart contract manifested in a bytecode form (or another suitable form factor) may be executable. The DLT node 106 may be in communication (e.g., wired, wireless, waveguide) with the network 102. The computing terminal 104 may be in communication with the DLT node 106 over the network 102, as a superuser thereof or a regular user thereof. The computing terminal 104 is separate and distinct from the DLT node 106, but the computing terminal 104 may be the DLT node 106.

The computing instance 108 may include a server (e.g., physical or virtual) running an OS and an application program running on the OS to enable, or a set of servers (e.g., physical or virtual) running a set of OSs and a set of application programs running on the set of OSs to collectively enable, various algorithms, as disclosed herein. For example, the computing instance 108 may be a server farm or a cloud computing instance. The computing instance 108 may operate scalably and fault-tolerantly. The computing instance 108 may be in communication (e.g., wired, wireless, waveguide) with the network 102. The computing terminal 104 may be in communication with the computing instance 108 over the network 102, as a superuser thereof or a regular user thereof. The computing instance 108 may be in communication with the DLT node 106, as a superuser thereof or a regular user thereof. The computing instance 108 is separate and distinct from the DLT node 106, but the computing instance 108 may be the DLT node 106.

The LLM 110 may be hosted on the computing instance 106. The LLM 110 may communicate or interface with the logic 112. Although the LLM 110 and the logic 112 are separate and distinct from each other, which may allow the logic 112 to programmatically engage with the LLM 110 on-demand, this configuration is not required and the LLM 112 can include the logic 112 or the logic 112 can include the LLM 110.

The LLM 110 may be a language model (e.g., a generative artificial intelligence (AI) model, a generative adversarial network (GAN) model, a generative pre-trained transformer (GPT) model) including an artificial neural network (ANN) with a set of parameters (e.g., tens of weight, hundreds of weights, thousands of weights, millions of weights, billions of weights, trillions of weights), initially trained on a quantity of unlabeled content (e.g., text, unstructured text, descriptive text, imagery, sounds) using a self-supervised learning algorithm or a semi-supervised learning algorithm to understand a set of corresponding data relationships. Then, the LLM 110 may be further trained by fine-tuning or refining the set of corresponding data relationships via a supervised learning algorithm or a reinforcement learning algorithm.

The LLM 110 may be a general purpose model, which may excel at a range of tasks (e.g., generating a content for a user consumption) and may be prompted, i.e., programmed to receive a prompt (e.g. a request, a command, a query), to do something or accomplish a certain task. The LLM 110 may be prompted via the logic 112. The LLM 110 may be embodied as or accessible via a chatbot hosted on the computing instance 108, where a user operating the computing terminal 104 chats with the chatbot in a human-readable form, where the human-readable form may be an unstructured text or a descriptive text, over the network 102, for the chatbot to output a content (e.g., a text, an unstructured text, a descriptive text, an image, a sound), i.e., to do something or accomplish a certain task. The user operating the computing terminal 104 may engage with the logic 112, which may responsively engage with the LLM 110, whether the user engages with the logic 112 via the chatbot or whether the logic 112 prompts the LLM 110 as the chatbot. The chatbot may be separate and distinct from the LLM 110 or the logic 112 or the LLM 110 or the logic 112 may include the chatbot or the chatbot may include the LLM 110 or the logic 112. The LLM 110 may be accessible (e.g., administered, managed, chatted, operated) from the computing terminal 104 communicating with the computing instance 108 over the network 102.

The LLM 110 may be embodied as or accessible via a ChatGPT AI chatbot developed by OpenAI and released in November 2022, based on OpenAI's GPT-3.5 and GPT-4 models and fine-tuned using supervised and reinforcement learning algorithms, which may include improvements thereto. The LLM 110 may be embodied as or accessible via a Google Bard AI chatbot developed by Google and released in March 2023, based on a PaLM model, which may include improvements thereto.

Once the LLM 110 is trained, the LLM 110 is structured to have a data structure and organized to have a data organization. As such, the data structure and the data organization collectively enable the LLM 110 to be prompted to (i) read a bytecode capable of being executed on a distributed ledger (e.g., the DLT node 106), (ii) determine whether the bytecode enables a smart contract on the distributed ledger, and (iii) take a first action based on the bytecode being determined to enable the smart contract and a second action based on the bytecode being determined to not enable the smart contract. The LLM 110 may determine whether the bytecode enables the smart contract by the bytecode expressing (1) an offeror identifier (e.g., a unique user network name on the P2P computer network) associated with an offeror network address (e.g., a unique user network locator on the P2P computer network) on the distributed ledger, (2) an offeree identifier (e.g., a unique user network name on the P2P computer network) associated with an offeree network address (e.g., a unique user network locator on the P2P computer network) on the distributed ledger, (3) an offer expression (e.g., a selection of an amount of a good or a service for a price value along with an expiry date if any) associated with the offeror identifier, (4) an acceptance expression (e.g., an indicator of consent for the offer expression) associated with the offeree identifier, and (5) a consideration expression (e.g., an indicator of a benefit to be respectively received) associated with the offeror identifier and the offeree identifier.

The bytecode may be compiled from a source code written in a programming language (e.g., Solidity, Vyper) for the smart contract to be deployed on the P2P computer network, including the DLT node 106. There may be multiple different bytecodes compiled from the source code, which may correspond to multiple different smart contracts on the P2P computer network, including the DLT node 106. Since the P2P computer network, including the DLT node 106, may include a distributed VM (e.g., Ethereum VM), the bytecode may be executed on the distributed VM, which may include the DLT node 106.

There may be several approaches to train the LLM 110 to read the bytecode and determine whether the bytecode enables the smart contract by expressing (1) the offeror identifier associated with the offeror network address on the distributed ledger, (2) the offeree identifier associated with the offeree network address on the distributed ledger, (3) the offer expression associated with the offeror identifier, (4) the acceptance expression associated with the offeree identifier, and (5) the consideration expression associated with the offeror identifier and the offeree identifier. One approach to train the LLM 110 may involve a supervised learning technique, where a set of data includes a set of labeled bytecode examples, for each data point to include features (covariates) and an associated label, to have a learning function that is inferred and maps feature vectors (inputs) to labels (output), based on example input-output pairs. Therefore, the learning function may be inferred from labeled training data containing a set of training examples (e.g., each example is a pair including an input object (e.g., a vector) and a desired output value (e.g., a supervisory signal)). As such, the LLM 110 may be supervisedly taught with a set of bytecode examples compiled from a source code example for a smart contract example, where each bytecode example is respectively labeled with (1) the offeror identifier associated with the offeror network address on the distributed ledger, (2) the offeree identifier associated with the offeree network address on the distributed ledger, (3) the offer expression associated with the offeror identifier, (4) the acceptance expression associated with the offeree identifier, and (5) the consideration expression associated with the offeror identifier and the offeree identifier. Also, the supervised learning technique may be improved (e.g., fine-tuned or refined) by having the LLM 110 being supervisedly taught with a set of opcodes for the P2P computer network, including the DLT node 106. Further, the supervised learning technique may be improved (e.g., fine-tuned or refined) by having the LLM 110 being supervisedly taught with a set of application interface examples (e.g., a set of application binary interface examples) compiled from the source code example for the smart contract example and corresponding to the set of bytecode examples, where each application interface example has its objects, instances, invocations, functions, calls, subroutines, or actions respectively labeled for utilizing (1) the offeror identifier associated with the offeror network address on the distributed ledger, (2) the offeree identifier associated with the offeree network address on the distributed ledger, (3) the offer expression associated with the offeror identifier, (4) the acceptance expression associated with the offeree identifier, and (5) the consideration expression associated with the offeror identifier and the offeree identifier. Additionally, the supervised learning technique may be improved (e.g., fine-tuned or refined) by having the LLM 110 being supervisedly taught with a glossary example that translates or a map example that maps a set of legal concept examples (e.g., what constitutes an offer, an acceptance, and consideration), expressed as a set of descriptive or unstructured text examples, associated with a jurisdictional identifier example (e.g., a state identifier, a province identifier, a country identifier), to (1) the offeror identifier associated with the offeror network address on the distributed ledger, (2) the offeree identifier associated with the offeree network address on the distributed ledger, (3) the offer expression associated with the offeror identifier, (4) the acceptance expression associated with the offeree identifier, and (5) the consideration expression associated with the offeror identifier and the offeree identifier. Moreover, the supervised learning technique may be improved (e.g., fine-tuned or refined) by the LLM 110 being supervisedly taught to interact or check its results with an application program (e.g., a block explorer, an analytics platform, an oracle data source) to review (e.g., investigate, explore, validate) the bytecode for the smart contract and a transaction associated with the bytecode, whether the application program may be hosted on or off the computing instance 108, the DLT node 106, or the computing terminal 104.

Since the bytecode compiled from the source code for the P2P computer network may differ for another P2P network, the LLM 110 may be supervisedly taught for multiple P2P computer networks, source codes, smart contracts, source codes, opcodes, application interfaces, and bytecodes. Therefore, although the LLM 110 may be prompted with an identifier for the P2P network to read the bytecode and determine whether the bytecode enables the smart contract by expressing (1) the offeror identifier associated with the offeror network address on the distributed ledger, (2) the offeree identifier associated with the offeree network address on the distributed ledger, (3) the offer expression associated with the offeror identifier, (4) the acceptance expression associated with the offeree identifier, and (5) the consideration expression associated with the offeror identifier and the offeree identifier, this configuration is not required and the LLM 110 may itself determine what P2P computer network corresponds to the bytecode.

The LLM 110 may perform the first action, which may include (a) identifying the offer expression in the bytecode, the acceptance expression in the bytecode, and the consideration expression in the bytecode, (b) generating a human-readable content describing the offer expression, the acceptance expression, and the consideration expression, and (c) outputting the human-readable content for consumption on the computing terminal 104. The LLM 110 may output the human-readable content to the computing terminal 104 or the logic 112 may receive the human-readable content from the LLM 110 and pass, whether as is or with modification, the human-readable content to the computing terminal 104. The human-readable content may include an unstructured text describing the offer expression, the acceptance expression, or the consideration expression. The unstructured text may include a descriptive text. The human-readable content may include an image describing the offer expression, the acceptance expression, or the consideration expression, which may be in an unstructured text, which may include a descriptive text. The human-readable content may include a sound describing the offer expression, the acceptance expression, or the consideration expression, when the sound is played on the computing terminal 104, whether automatically or on-demand. The human-readable content may be exportable or saved as a data file (e.g., a sound file, an image file, a text file, a productivity suite file, a portable document format file).

The LLM 110 may perform the second action, which may include outputting a notice for consumption on the computing terminal 104, where the notice indicates the bytecode being determined to not enable the smart contract. The LLM 110 may output the notice to the computing terminal 104 or the logic 112 may receive the notice from the LLM 110 and pass, whether as is or with modification, the notice to the computing terminal 104. If the computing terminal 104 has a display or a speaker, then the notice may respectively be output by the display or the speaker.

The logic 112 may be hosted by the computing instance 108. The logic 112 may include a software logic, which may include an application program, a software server program, a virtual server program, a script, an application program (e.g., a productivity suite application program, a browser application program) add-on, an application program (e.g., a productivity suite application program, a browser application program) extension, a mobile application program, a chatbot, a module, an engine, which may be startable, stoppable, or pausable, a driver, an executable file, or another suitable form of software logic, which may be distributably run on the set of servers, as disclosed herein.

The logic 112 may be built via or on top of a software development language integration framework (e.g., LangChain framework) designed to simplify at least some creation of applications using LLMs, including the LLM 110 (e.g., to be data aware or agentic). The computing instance 108 may host the software development language integration framework or the software development language integration framework may be hosted off the computing instance 108 (e.g., a server). The software development language integration framework can be used for chatbots, Generative Question-Answering (GQA), summarization, and other techniques suitable for algorithms disclosed herein, by chaining together different components to create more advanced use cases around the LLM 110. Although the LLM 110 and the logic 112 are separate and distinct from each other, which may allow the logic 112 to programmatically engage with the LLM 110 on-demand, this configuration is not required and the LLM 112 can include the logic 112 or the logic 112 can include the LLM 110.

In situations where at least the LLM 110 needs to be augmented with private data, a toolkit to help perform this data augmentation (e.g., LlamaIndex toolkit, GPT Index toolkit) may be used, whether hosted on the computing instance 108 or off the computing instance 108. The toolkit may be used by the logic 112 or be included in the logic 112. The toolkit may provide data connectors to ingest existing data sources and data formats (e.g., application programming interfaces, data files, portable document format files, productivity suite files, source code strings, source code strings for domain-specific languages used in programming and designed for managing data held in relational database management systems). The toolkit may provide ways to structure data (e.g., indices, graphs) so that this data can be used with the LLM 112. The toolkit may provide an advanced retrieval/query interface over data, a prompt may be fed into the LLM 112 to get back retrieved context and knowledge-augmented output. The toolkit may provide or allow integrations with an outer application framework (e.g. LangChain framework, Flask framework, Docker framework, ChatGPT chatbot). For example, the logic 112 can invoke or utilize LangChain framework and Llama toolkit. The toolkit may provide customizing or extending software modules (e.g., data connectors, indices, retrievers, query engines, reranking modules), as needed.

In situations where at least more precision may be needed, the logic 112 may include or interface with an AI agent (e.g., Auto-GPT agent) that, given a goal in natural language (e.g., human-readable unstructured or descriptive text), attempts to reach the goal by breaking the goal into a set of sub-tasks and using the network 102 (e.g., Internet) and other tools in an automatic looping process. For example, the AI agent may assigns itself new objectives to work on with a focus on achieving a greater goal, without manual input, by executing responses to prompts to accomplish a goal task, and in doing so will create and revise its own prompts to recursive instances in response to new information. The AI agent may manage its short-term or long-term memory by writing to and reading from databases and files, manage context window length requirements with summarization, may perform network-based actions (e.g., unattended web searching interactions, unattended web form interactions, unattended API interactions), or others. For example, the logic 112 can invoke or utilize LangChain framework and Llama toolkit, together with the AI agent. The computing instance 108 may host the AI agent or the AI agent may be hosted off the computing instance 108.

The logic 112 may be programmed to communicate or interface with the LLM 110. The computing terminal 104 may communicate with the computing instance 108 over the network 102 such that the logic 112 presents a user interface, which may include a graphical user interface, on the computing terminal 104. The user interface may be programmed to present a screen or a menu programmed to receive the offeror network address from the computing terminal 104 (e.g., as input via a physical or virtual keyboard) and the offeree network address from the computing terminal 104 (e.g., as input via a physical or virtual keyboard). As such, the logic 112 may access the P2P computer network, including the DLT node 106, and locate the bytecode on the P2P computer network, including the DLT node 106, based on the offeror network address and the offeree network address, as received from the computing terminal 104. The P2P computer network, including the DLT 106 node, may include a distributed virtual machine, which the logic 112 accesses to locate the bytecode on the P2P computer network, including the DLT 106 node, based on the offeror network address and the offeree network address. The logic 112 may form a copy of the bytecode and prompt the LLM 110 with the copy such that the LLM 110 (*a*) determines whether the copy enables the smart contract and (b) takes the first action based on the copy being determined to enable the smart contract and the second action based on the copy being determined to not enable the smart contract.

As explained above, the LLM 110 may be trained via a supervised learning technique by having the LLM 110 being supervisedly taught with a glossary example that translates or a map example that maps a set of legal concept examples (e.g., what constitutes an offer, an acceptance, and consideration), expressed as a set of descriptive or unstructured text examples, associated with a jurisdictional identifier example (e.g., a state identifier, a province identifier, a country identifier), to (1) the offeror identifier associated with the offeror network address on the distributed ledger, (2) the offeree identifier associated with the offeree network address on the distributed ledger, (3) the offer expression associated with the offeror identifier, (4) the acceptance expression associated with the offeree identifier, and (5) the consideration expression associated with the offeror identifier and the offeree identifier. This modality of training may include supervisedly teaching as to what potential defense statements may relate to the smart contract when the bytecode is determined to enable the smart contract on the P2P computer network, including the DLT node 106. The potential defense statements, which may be manifested via a content including a text, an unstructured text, a descriptive text, an image, or a sound, may include a statement indicating indefiniteness, the offer expression is not an offer expression or not sufficiently detailed to be an offer expression, the acceptance expression is not an acceptance expression or not sufficiently detailed to be an acceptance expression, the consideration expression is not a consideration expression or not sufficiently detailed to be a consideration expression, mistake (e.g., wrong dates), lack of capacity (e.g., hacked user accounts), impossibility, or other suitable potential defense statements. Therefore, when the bytecode is determined to enable the smart contract on the P2P computer network, including the DLT node 106, the LLM 110 can take the first action where the first action includes identifying a potential defense statement to the offer expression, the acceptance expression, or the consideration expression, generating the human-readable content including the potential defense statement, and outputting the human-readable content including the potential defense statement. When the bytecode is determined to enable the smart contract on the P2P computer network, including the DLT node 106, and when the bytecode enables a jurisdictional identifier (e.g., Louisiana, New York) associated with the offer expression, the acceptance expression, and the consideration expression, then the LLM 110 may take the first action including identifying the jurisdictional identifier, determining whether the potential defense statement is applicable to the jurisdictional identifier, and taking a third action based on the potential defense statement being determined to be applicable to the jurisdictional identifier and a fourth action based on the potential defense statement being determined to not be applicable to the jurisdictional identifier. The third action may include generating the human-readable content including the potential defense statement and outputting the human-readable content including the potential defense statement. The fourth action may include outputting an alert indicating the potential defense statement being determined to not be applicable to the jurisdictional identifier. Since the LLM 110 may be prompted from the computing terminal 104 at a location (e.g., a physical location, a network location), whether via the computing terminal 104 or through the logic 112, the computing instance 108, which may include the LLM 110 or the logic 112, may be programmed to determine the location when the bytecode is determined to enable the smart contract on the P2P computer network, including the DLT node 106, such that the third action or the fourth action involves determining whether the location is covered (geographically) by the jurisdictional identifier and outputting a first message based the location being determined to be covered by the jurisdictional identifier and a second message based the location being determined to not be covered by the jurisdictional identifier.

Since the bytecode may enable the smart contract on the P2P computer network involving an entity that may be whitelisted or blacklisted, the LLM 110 may be programmed for various actions. The LLM 110 may be programmed such that the first action may include determining whether the offeror identifier, the offeror network address, the offeree identifier, the offeree network address, the offer expression, the acceptance expression, or the consideration expression include or relate to an entity identifier listed in a list, whether a whitelist or a blacklist, and outputting a message indicating the entity identifier being listed in the list. The LLM 110 may be programmed such that the first action may include determining whether the offeror identifier, the offeror network address, the offeree identifier, the offeree network address, the offer expression, the acceptance expression, or the consideration expression include or relate to an entity identifier not listed in a list, whether a whitelist or a blacklist, and outputting a message indicating the entity identifier not being listed in the list.

Figure 2:
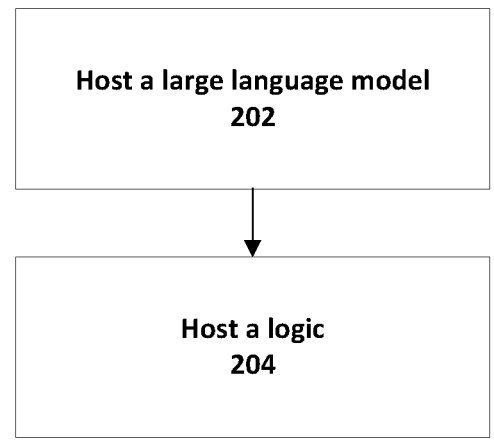
FIG. 2 shows a flowchart of an embodiment of a method according to this disclosure.

FIG. 2 shows a flowchart of an embodiment of a method according to this disclosure. As explained above, a method 200 may be performed by the architecture 100.

The method 200 may include hosting, by the computing instance 108, the LLM 110 trained to (i) read the bytecode capable of being executed on the distributed ledger, (ii) determine whether the bytecode enables the smart contract on the distributed ledger, and (iii) take the first action based on the bytecode being determined to enable the smart contract and the second action based on the bytecode being determined to not enable the smart contract. The bytecode may enable the smart contract by expressing (1) the offeror identifier associated with the offeror network address on the distributed ledger, (2) the offeree identifier associated with the offeree network address on the distributed ledger, (3) the offer expression associated with the offeror identifier, (4) the acceptance expression associated with the offeree identifier, and (5) the consideration expression associated with the offeror identifier and the offeree identifier. The first action may include (a) identifying the offer expression, the acceptance expression, and the consideration expression, (b) generating the human-readable content describing the offer expression, the acceptance expression, and the consideration expression, and (c) outputting the human-readable content for consumption on the computing terminal 104. The second action may include outputting a notice for consumption on the computing terminal 104, where the notice indicates the bytecode being determined to not enable the smart contract.

The method 200 may include hosting, by the computing instance 108, the logic 112 programmed to (i) receive the offeror network address from the computing terminal 104 and the offeree network address from the computing terminal 104, (ii) locate the bytecode on the distributed ledger based on the offeror network address and the offeree network address, (iii) form the copy of the bytecode, and (iv) prompt the LLM 110 with the copy such that the LLM 110 (*a*) determines whether the copy enables the smart contract and (b) takes the first action based on the copy being determined to enable the smart contract and the second action based on the copy being determined to not enable the smart contract.

Features described with respect to certain embodiments may be combined in or with various other embodiments in any permutational or combinatory manner. Different aspects or elements of example embodiments, as disclosed herein, may be combined in a similar manner. The skilled artisan will understand that typically there is no limit on the number of items or terms in any combination, unless otherwise apparent from the context.

Hereby, all issued patents, published patent applications, and non-patent publications (including identified articles, web pages, websites, products and manuals thereof) that are mentioned in this disclosure are herein incorporated by reference in their entirety for all purposes, to same extent as if each individual issued patent, published patent application, or non-patent publication were specifically and individually indicated to be incorporated by reference. If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to be-come coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or pro-gram statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as dis-closed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required be-fore, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled artisans know that various modifications, additions, substitutions and the like can be made without departing from spirit of this disclosure. As such, these are considered to be within the scope of the disclosure, as defined in the following claims.

What is claimed is:

1. A system, comprising:
 a computing instance programmed to:
  host a large language model (LLM) trained to (i) read a bytecode capable of being executed on a distributed ledger, (ii) determine whether the bytecode enables a smart contract on the distributed ledger, and (iii) take a first action based on the bytecode being determined to enable the smart contract and a second action based on the bytecode being determined to not enable the smart contract, wherein the bytecode enables the smart contract by expressing (1) an offeror identifier associated with an offeror network address on the distributed ledger, (2) an offeree identifier associated with an offeree network address on the distributed ledger, (3) an offer expression associated with the offeror identifier, (4) an acceptance expression associated with the offeree identifier, and (5) a consideration expression associated with the offeror identifier and the offeree identifier, wherein the first action includes (a) identifying the offer expression, the acceptance expression, and the consideration expression, (b) generating a human-readable content describing the offer expression, the acceptance expression, and the consideration expression, and (c) outputting the human-readable content for consumption on a computing terminal, wherein the second action includes outputting a notice for consumption on the computing terminal, wherein the notice indicates the bytecode being determined to not enable the smart contract; and host a logic programmed to (i) receive the offeror network address from the computing terminal and the offeree network address from the computing terminal, (ii) locate the bytecode on the distributed ledger based on the offeror network address and the offeree network address, (iii) form a copy of the bytecode, and (iv) prompt the LLM with the copy such that the LLM (a) determines whether the copy enables the smart contract and (b) takes the first action based on the copy being determined to enable the smart contract and the second action based on the copy being determined to not enable the smart contract, wherein the computing instance is a physical server or a set of physical servers.

2. The system of claim 1, wherein the human-readable content includes an unstructured text describing the offer expression, the acceptance expression, and the consideration expression.

3. The system of claim 1, wherein the human-readable content includes an image describing the offer expression, the acceptance expression, and the consideration expression.

4. The system of claim 1, wherein the human-readable content includes a sound describing the offer expression, the acceptance expression, and the consideration expression.

5. The system of claim 1, wherein the first action includes identifying a potential defense statement to the offer expression, the acceptance expression, or the consideration expression, generating the human-readable content including the potential defense statement, and outputting the human-readable content including the potential defense statement for consumption on the computing terminal.

6. The system of claim 5, wherein the bytecode includes a jurisdictional identifier associated with the offer expression, the acceptance expression, and the consideration expression, wherein the first action includes identifying the jurisdictional identifier, determining whether the potential defense statement is applicable to the jurisdictional identifier, and taking a third action based on the potential defense statement being determined to be applicable to the jurisdictional identifier and a fourth action based on the potential defense statement being determined to not be applicable to the jurisdictional identifier.

7. The system of claim 6, wherein the third action includes generating the human-readable content including the potential defense statement and outputting the human-readable content including the potential defense statement for consumption on the computing terminal.

8. The system of claim 6, wherein the fourth action includes outputting an alert indicating the potential defense statement being determined to not be applicable to the jurisdictional identifier for consumption on the computing terminal.

9. The system of claim 6, wherein the LLM is prompted from the computing terminal at a location, wherein the computing instance is programmed to determine the location such that the third action or the fourth action involves determining whether the location is covered by the jurisdictional identifier and outputting a first message based the location being determined to be covered by the jurisdictional identifier for consumption on the computing terminal and a second message based the location being determined to not be covered by the jurisdictional identifier for consumption on the computing terminal.

10. The system of claim 1, wherein the first action includes determining whether the offeror identifier, the offeror network address, the offeree identifier, the offeree network address, the offer expression, the acceptance expression, or the consideration expression include or relate to an entity identifier listed in a list and outputting a message indicating the entity identifier being listed in the list for consumption on the computing terminal.

11. The system of claim 1, wherein the first action includes determining whether the offeror identifier, the offeror network address, the offeree identifier, the offeree network address, the offer expression, the acceptance expression, or the consideration expression include or relate to an entity identifier not listed in a list and outputting a message indicating the entity identifier not being listed in the list for consumption on the computing terminal.

12. The system of claim 1, wherein the distributed ledger includes a distributed virtual machine which the logic accesses to locate the bytecode on the distributed ledger based on the offeror network address and the offeree network address.

13. The system of claim 1, wherein the logic is user interactable from the computing terminal.

14. The system of claim 1, wherein the LLM and the logic are separate and distinct from each other.

15. The system of claim 1, wherein the LLM is trained to (i) read the bytecode capable of being executed on the distributed ledger, (ii) determine whether the bytecode enables the smart contract on the distributed ledger, and (iii) take the first action based on the bytecode being determined to enable the smart contract and the second action based on the bytecode being determined to not enable the smart contract, via a supervised learning technique.

16. The system of claim 1, wherein the LLM is trained to (i) read the bytecode capable of being executed on the distributed ledger, (ii) determine whether the bytecode enables the smart contract on the distributed ledger, and (iii) take the first action based on the bytecode being determined to enable the smart contract and the second action based on the bytecode being determined to not enable the smart contract, via a non-supervised learning technique.

17. The system of claim 1, wherein the computing instance is the physical server.

18. The system of claim 1, wherein the computing instance is the set of physical servers.

19. The system of claim 18, wherein the set of physical servers is a server farm.

20. The system of claim 1, wherein the computing instance is configured to operate scalably and fault-tolerantly.

21. A method, comprising:

hosting, by a computing instance, a large language model (LLM) trained to (i) read a bytecode capable of being executed on a distributed ledger, (ii) determine whether the bytecode enables a smart contract on the distributed ledger, and (iii) take a first action based on the bytecode being determined to enable the smart contract and a second action based on the bytecode being determined to not enable the smart contract, wherein the bytecode enables the smart contract by expressing (1) an offeror identifier associated with an offeror network address on the distributed ledger, (2) an offeree identifier associated with an offeree network address on the distributed ledger, (3) an offer expression associated with the offeror identifier, (4) an acceptance expression associated with the offeree identifier, and (5) a consideration expression associated with the offeror identifier and the offeree identifier, wherein the first action includes (a) identifying the offer expression, the acceptance expression, and the consideration expression, (b) generating a human-readable content describing the offer expression, the acceptance expression, and the consideration expression, and (c) outputting the human-readable content on a computing terminal, wherein the second action includes outputting a notice on the computing terminal, wherein the notice indicates the bytecode being determined to not enable the smart contract; and hosting, by the computing instance, a logic programmed to (i) receive the offeror network address from the computing terminal and the offeree network address from the computing terminal, (ii) locate the bytecode on the distributed ledger based on the offeror network address and the offeree network address, (iii) form a copy of the bytecode, and (iv) prompt the LLM with the copy such that the LLM (a) determines whether the copy enables the smart contract and (b) takes the first action based on the copy being determined to enable the smart contract and the second action based on the copy being determined to not enable the smart contract, wherein the computing instance is a physical server or a set of physical servers.

22. The method of claim 21, wherein the computing instance is the physical server.

23. The method of claim 21, wherein the computing instance is the set of physical servers.

24. The method of claim 23, wherein the set of physical servers is a server farm.

25. The method of claim 21, wherein the computing instance is configured to operate scalably and fault-tolerantly.

26. A non-transitory storage medium storing a set of instructions executable by a computing instance to perform a method, wherein the computing instance is a physical server or a set of physical servers, wherein the method comprising:

hosting, by the computing instance, a large language model (LLM) trained to (i) read a bytecode capable of being executed on a distributed ledger, (ii) determine whether the bytecode enables a smart contract on the distributed ledger, and (iii) take a first action based on the bytecode being determined to enable the smart contract and a second action based on the bytecode being determined to not enable the smart contract, wherein the bytecode enables the smart contract by expressing (1) an offeror identifier associated with an offeror network address on the distributed ledger, (2) an offeree identifier associated with an offeree network address on the distributed ledger, (3) an offer expression associated with the offeror identifier, (4) an acceptance expression associated with the offeree identifier, and (5) a consideration expression associated with the offeror identifier and the offeree identifier, wherein the first action includes (a) identifying the offer expression, the acceptance expression, and the consideration expression, (b) generating a human-readable content describing the offer expression, the acceptance expression, and the consideration expression, and (c) outputting the human-readable content on a computing terminal, wherein the second action includes outputting a notice on the computing terminal, wherein the notice indicates the bytecode being determined to not enable the smart contract; and hosting, by the computing instance, a logic programmed to (i) receive the offeror network address from the computing terminal and the offeree network address from the computing terminal, (ii) locate the bytecode on the distributed ledger based on the offeror network address and the offeree network address, (iii) form a copy of the bytecode, and (iv) prompt the LLM with the copy such that the LLM (a) determines whether the copy enables the smart contract and (b) takes the first action based on the copy being determined to enable the smart contract and the second action based on the copy being determined to not enable the smart contract.

27. The non-transitory storage medium of claim 26, wherein the computing instance is the physical server.

28. The non-transitory storage medium of claim 26, wherein the computing instance is the set of physical servers.

29. The non-transitory storage medium of claim 28, wherein the set of physical servers is a server farm.

30. The non-transitory storage medium of claim 26, wherein the computing instance is configured to operate scalably and fault-tolerantly.

* * * * *